July 19, 1949. F. KAUTZ Re. 23,136

STRUCTURAL MEMBER

Original Filed Aug. 21, 1944 3 Sheets-Sheet 1

INVENTOR.

Frederick Kautz

STRUCTURAL MEMBER

Original Filed Aug. 21, 1944 3 Sheets-Sheet 2

INVENTOR.

Frederick Kautz

July 19, 1949. F. KAUTZ Re. 23,136

STRUCTURAL MEMBER

Original Filed Aug. 21, 1944 3 Sheets-Sheet 3

INVENTOR.

Frederick Kautz

Reissued July 19, 1949

Re. 23,136

UNITED STATES PATENT OFFICE 23,136

STRUCTURAL MEMBER

Frederick Kautz, Glenolden, Pa.

Original No. 2,409,212, dated October 15, 1946, Serial No. 550,427, August 21, 1944. Application for reissue September 25, 1947, Serial No. 776,006

30 Claims. (Cl. 189—34)

The invention relates to welded structures incorporating as a substantial portion, a sheet web or plate reinforced by an arrangement of stiffeners welded thereto, such as may be used in vessels, containers, partition walls, flooring, shelving, etc., and other structures for various purposes. More particularly, it deals with an intermediate stiffening arrangement for webbed portions in the referred to structures and being employed in supplemental combination with respective reinforcing system.

In welded constructions, the practice of having a flange of a stiffening member disposed in parallel contact with a sheet, such as being used in riveting, has been mostly abandoned and, instead, it has been preferred to weld a narrow edge portion of such member directly to a sheet. Accordingly, the outwardly directed flanges in members, otherwise laid in parallel contact with a sheet, have led to a considerable increase in strength and the resulting advantages have been extensively utilized as a material and weight saving factor.

For instance, a narrow edge portion of single flat bars may be readily welded to a sheet leaving the transverse section of the bars extended therefrom. Also angle bars may be similarly treated with one flange in right angular disposition to the sheet and a component flange in spaced relation thereto, or, in another variation, the narrow edge portion of both flanges may contact a sheet leaving a transverse section of flanges in diagonal relation thereto and convergent to each other.

In the first mentioned version, reasonable strength and rigidity has been obtained at considerable saving of weight and material, and in the use of angle bars as indicated, the strength in the first form is superior to the second form which is, however, useful on thinner sheets due to its broad support and resilient qualities under moderate loads.

In cases where only a narrow edge portion of a stiffener contacts a sheet, rigidity in a wider sheet area is often inadequately attained due to the narrow face of contact of the stiffening member, necessitating closer spacing of the members and use of greater numbers in effecting a correction. In thinner gauged sheet webs, the surface often acquires a scalloped appearance for the same reason which is further aided by the contracting effect of the welding heat on the material. Further, the resistance of the flat bar to torsional stresses is insufficient.

It is now one of the main objects of the invention to provide a reinforcing arrangement for an extended body member in which the advantages derived from welding a narrow edge portion of stiffeners to a web are fully utilized and stated disadvantages minimized or eliminated. It is, therefore, a further object of the invention to provide stiffeners which lend a broader support to a body member by means requiring only an inconsiderable amount of additional material and permitting simultaneously an essential increase of strength in the stiffeners and entire structures.

Another more specific object of the invention aims to increase the efficiency of flat bars and angle bars in the use as members of said stiffeners by respective disposition such as to support a wider body member area and reinforce the extreme edge portions as a means for obtaining greater strength. A further object shall provide a stiffener of a flexible nature permitting a shifting of portions already incorporated therein to locations where stresses are more aparent, thereby contributing to higher strength without the use of additional material.

Still another object of the invention shall provide an intermediate stiffener or an arrangement of such stiffeners supplementing the reinforcing system and embodying the features as previously outlined, and another object may provide sectional reinforcement of said stiffeners for the same purpose.

It is also aimed that the disposition of sections or portions in such stiffeners can be easily adjusted to comply with changing requirements so as to obtain maximum strength, if desired, or, support of widest body member area if such is preferred.

Additional objects, advantages and features of invention will be apparent from the following description considered in conjunction with the accompanying drawings, wherein Figure 1 is a perspective view representing a structure which may be a fraction of the underside of flooring, shelving, etc., embodying one form of the novel intermediate stiffener.

According to the invention, structures or structural members embodying sheets or plates supported by a reinforcing arrangement include a stiffener member or a plurality of such members in spaced relation of the following characteristics. In said members, as exemplified by one of the preferred executions thereof, elongated flat bar sections are successively extended from each other in a longitudinal direction and narrow edge portions thereof are placed in contiguity to the body member and welded thereto. The transverse portions of the flat bar sections in the members further are reciprocally inclined towards each other from the locations of attachment to the body member which are set apart from a common longitudinal plane in alternate opposite directions, and the end portions of the sections are preferably joined in lapped relation or secured to an intersecting member, being a portion of said reinforcing arrangement. The terminal portions of such stiffening members may be secured to adjacent portions of the supplementing reinforcing arrangement or may be supported by a brace attached between the outer edge portions of the stiffeners and adjacent body member. In another version of the invention, the intersecting member may also be composed of successively extended sections, reciprocally inclined towards each other as previously mentioned.

It is obvious that the length of the sections in such stiffeners and the length and locations of the lapped portions may be varied at will permitting such a reinforcement where a structure may be more subjected to stresses and other modifications and variations for many purposes.

Figure 1:
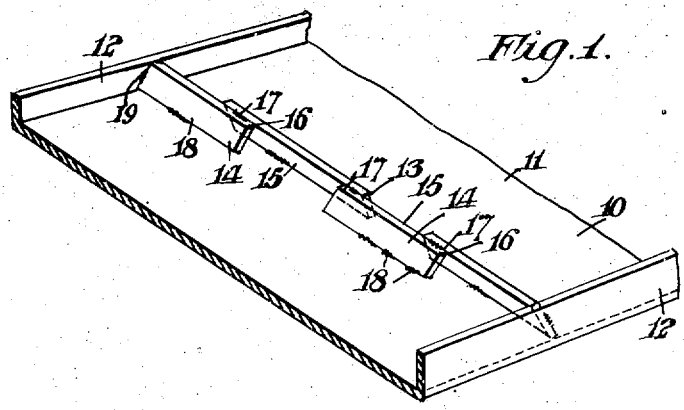

For a more detailed description of the invention, reference is made to the accompanying drawings, in which in Figure 1, there is shown a structure 10 which may represent the underside of a section of flooring comprising as a portion a body member 11 supported by marginal flanges 12 with transverse section at right angles to the body member.

The novel feature is embodied in an intermediate stiffening member 13 extended between the marginal flanges and contacting and reinforcing the body member 11. As shown, the stiffener is composed, in present instance, of four elongated separate sections of flat bar stock 14 of equal length successively extended from each other. The narrow edge portions of the sections contacting the body member are set apart from a common longitudinal plane in alternate opposite directions, and transverse portions of the bars are reciprocally inclined therefrom towards each other so as to place extreme edge portions 15 of the sections in a substantially common longitudinal plane. As a means for securing the sections to each other, the end portions are placed in lapped relation as at 16 bringing such extreme edge portions of the sections in direct abutment at a length equal to the lap where welding 17 is deposited to unite the sections. The edge portions of the bars contacting the body member are likewise welded thereto by intermittent welding as shown at 18 which may be extended to full length seam welds, if deemed necessary. The terminal portions of the stiffener further are secured to the marginal flanges by welding, as at 19.

One may also note that in Figure 1, the lapped portions of the sections are distributed over transverse portions of the body member at the middle and at respective halves thereof and the terminal portions of the stiffener are disposed in opposite inclination relative to each other.

It is obvious that many advantages are derived from the described stiffening arrangement. In alternately spreading the portions contacting the body member, a wider area thereof is sustained which reduces the tendency of the sheet metal to acquire a scalloped appearance and improves the resistance to concentrated stress. It has been observed that the lapped portions which are of angular cross section add considerably to the strength of the stiffener which is especially able to absorb loads at locations of said lapped portions. It is therefore, an advantage to distribute the lapped portions at points where a body member shows a natural weakness which, in the example of Figure 1 is the mid-section and respective portions thereof as being reinforced by said lapped portions. It is further advisable for the same reason, to choose the number of sections in stiffeners in the order of 2, 4, 6, etc., (an even number) as in such cases, a lapped portion will always be located at midsection of a span and respective intermediate portions at equal distances at both sides thereof, as seen in Figure 1, one lap portion at the middle and one at each side thereof. This arrangement will also insure the disposition of terminal portions at the opposite inclination which is useful in providing better resistance in stiffeners to torsional stresses.

The stiffeners also receive additional strength from the bracing effect which is exerted on the extreme edge portions by the lapped portions at intermediate points. The inclination of the sections or flanges have a beneficial effect if kept within reasonable limits as an eventual deflection of a section is not of an erratic nature, but definitely directed towards the side of the inclination where it is effectively checked by reciprocal co-operation of the adjacent section.

It is understood that the inclination of the sections may be subject to wide variations and an inclination of 60 to 80 degrees towards the body member may be considered as most favorable for best strength effect. At a further progressive inclination, wider areas of the body member will be braced but actual strength of stiffeners is lost, and the degree of said disposition of the sections may be decided in view of the effect one desires to obtain, whether maximum strength of the stiffeners or rigidity of the body member is the primary goal.

It is of interest to note that all advantages, such as superior strength, wider support of body member, better torsional resistance, etc., are obtained by very economical means involving only an insignificant amount of additional material represented by merely half of material embodied in said lapped portions.

Figure 2:
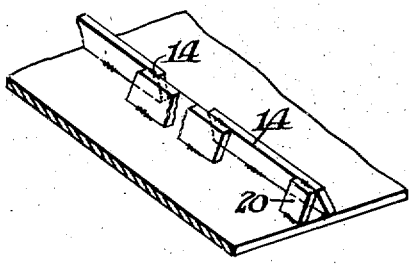
Figures 2 to 5 show similar perspectives of various modified forms of the stiffener shown in Figure 1.

In Figure 2 a method is shown of supporting the terminal portion of a stiffener of same construction as in Figure 1, by an auxiliary brace or support member 20, placed and secured by welding between the extreme edge portion of the terminal section and a portion of adjacent body member. The brace is reciprocally inclined towards the section and may be employed in cases where a suitable support member such as in Figure 1 is lacking. The support of the terminal portions is essential to strength of the stiffeners.

Figure 3:
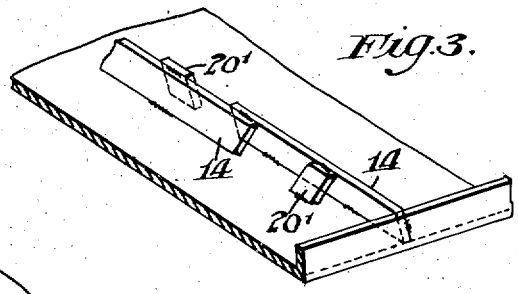
Figure 4:
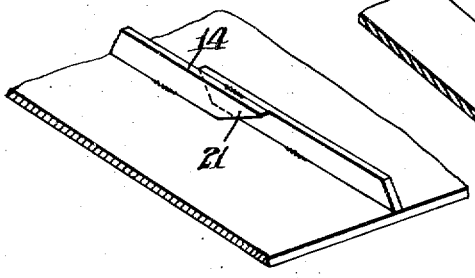
Figure 5:
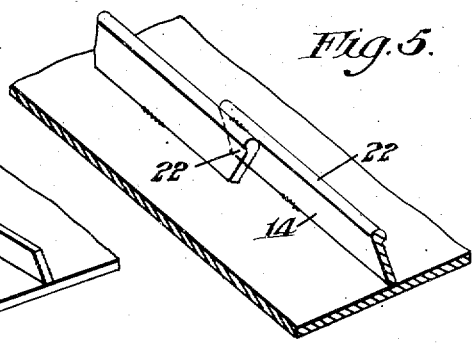

In Figures 3 to 5, representing modifications of the structure of Figure 1, methods are shown for reinforcing the stiffeners by strengthening the intermediate and extreme edge portions of the sections. In Figure 3, a brace or support member 20' is employed, spanning the intermediate portions of the sections and adjacent web portions at opposite inclination to the respective sections. The brace is also secured by welding to respective portions and the location is preferably at the middle of longitudinal extensions of the sections as a deflection of the flat bar sections will first materialize there. Additional braces may be added to the sections at spaced intervals if found desirable, which is understood.

In Figure 4, the extreme edge portions of the sections 14 are shown to be of greater length than the portions contiguous to the body member at the lapped portions defined by transverse cuts 21 at a diagonal line. In this way, the contact of the sections at the lapped portions can be lengthened at a saving of weight and respective reciprocal extensions of the sections at extreme edge portions are shortened which may be regarded as a considerable contribution to strength of the stiffeners. The transverse cut at 21 also reduces the possibility of notch effects at ends of said lapped portions.

In Figure 5, the sections are composed of stock bars 14 having a so-called bulb edge 22 which is of thicker cross section than the remaining portion of said bars. The bulb edges being disposed so as to form the extreme edge portions of the sections as seen in Figure 5 to add more strength to the stiffeners, as ruptures or deflection will be more effectively checked by said means.

Figure 6:
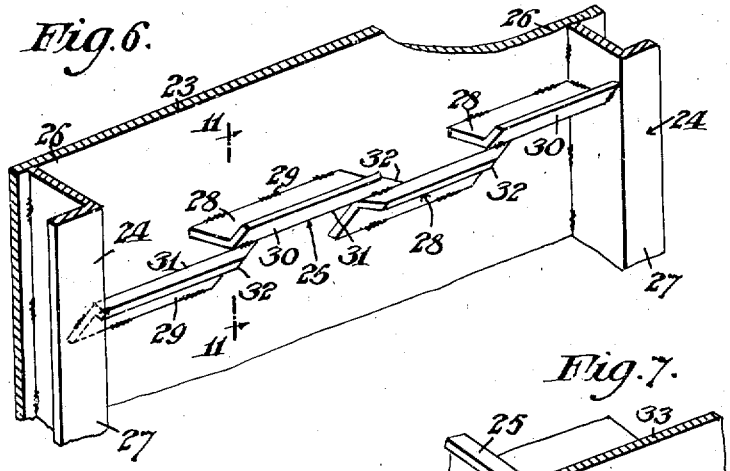
Figure 6 is a fragmentary perspective view of a ship hull construction incorporating a reinforcing arrangement including another form of the invention.

In Figure 6, the structure shown represents a portion of a ship hull construction embodying a plate member 23, reinforced by spaced upright angle members 24 and a brace 25 extended therebetween. The angle members 24 have a narrow edge portion 26 welded to the plate and respective flanges 27 are disposed at right angles thereto. The brace may be regarded as a modified form of stiffener shown in Figure 1, in which the flat bars are replaced by separate sectional members of angle stock 28 similarly arranged so as to place a narrow edge portion 29 of the angle sections in contact with the plate and respective flange portions 30 in reciprocal inclination towards each other. The extreme edge portion of the brace located in a substantially common longitudinal line is defined by the vertex portions 31 of the angle sections and respective transverse portions of the flanges are diagonally extended therefrom to the plate and outwardly in spaced relation thereto. The latter flanges have beveled end portions 32 as a weight saving feature, and are also alternatively extended from each other in opposite directions relative to said sections of the brace.

The angular sections consist of four in number, as in Figure 1 and are joined together by welding in the lapped portions where end portions of said sections are mutually abutted at the angle vertex. The brace is attached to the plate by full length welding in the present instance. The number of sections chosen also locates a lapped portion at half distance between upright members and others at equal proportions thereof and permits the terminal sections to be welded to said upright members at the end portions thereof at opposite inclination to each other to obtain the benefit of the advantages as previously described.

It is apparent that the qualities of the brace members, of a type such as 25, are superior to the stiffener in Figure 1 due to the additional flange in the sections which acts as a preventive against rupture and deflection. The brace in Figure 6 is further strengthened by having the lapped portion at midsection of comparatively greater length than remaining similar portions and the two angle sections joined at the same location of greater thickness in transverse section as compared to terminal sections of the brace. In this way an equivalent to a change in the section modulus of the brace is provided, lending greater support to the plate at weaker area of the midsection between said upright angle members.

It is to be understood that in said arrangements, a differential length of lapped portions may be varied as found expedient and may also be used in other forms of the invention.

It is further understood that the brace as in Figure 6 may be used in a multiplicity of units, at spaced relation or in other structures such as flooring, partitions, etc.

Figure 7:
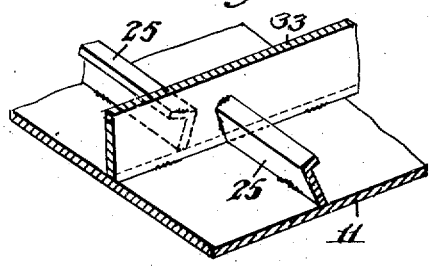
Figure 7 is a fragmentary perspective view illustrating a detailed view of a further development of the structure of Figure 6.

The structure of Figure 7 may be regarded as a supplement to Figure 6, showing the method of extending the brace of Figure 6 beyond a transversely intersection member 33 such as the upright angle members in Figure 6 by abutting and welding respective terminal sections of braces as 25 at a reciprocal inclination which is necessary for best strength effect.

Figure 8:
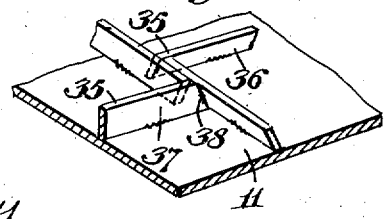
Figure 8 is a fragmentary perspective view of a similar structure as in Figure 1, of a modified form.

The stiffening arrangement presented in Figure 8 includes the stiffener of Figure 1 supplemented by a transversely located stiffener consisting of flat bar sections 35 extended from opposite ends of the lapped portion and having a narrow edge portion 36 in welded contact with the body member and a transverse section 37 of the flat bars set at right angle thereto. Said sections are mutually joined to respective inclined bar sections by welding and by a method in which the bevel shaped end portions 38 of said sections are abutted to respective inclined bars. The portions closely adjacent to said beveled ends are contacted to respective ends of said lapped portion. In such an arrangement, said transverse sections are spaced apart from a common line corresponding to the length of lapped portion which is useful in bracing a wider body portion area, although it may not be recommended for maximum strength.

Figure 9:
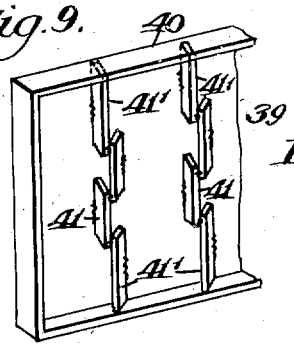
Figure 9 is a fragmentary perspective view showing a partition wall construction, being reinforced by several spaced intermediate stiffeners of a type such as seen in Figure 1, in modified form.

In Figure 9 the structure shown may represent a section of a partition wall or may also be interpreted as a section of flooring, etc. It comprises principally a sheet web 39 having a marginal frame 40 as a support which is supplemented by spaced apart upright intermediate stiffeners 41 welded to the web and frame respectively. Said stiffeners are of same construction as shown in Figure 1 including four sections arranged so as to place lapped portions at the medial horizontal line of the web which is of advantage as outlined before. One may further note that the terminal sections 41' in said stiffeners are of greater length in comparison to the inwardly located sections resulting in a shifting of the lapped portions to locations closer to said medial line. In this arrangement, the strengthening effect of the stiffeners is increased as the naturally weaker central web area receives additional support from said shifted lapped portions while the web area closer to said marginal frame is not in need of equal support as being more influenced therefrom.

Figure 10:
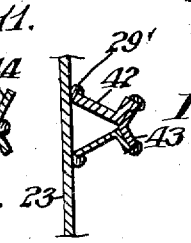
Figure 10 is a cross section on the line 11—11 of Figure 6 but showing a modification thereof.

In Figure 10, the construction of the brace of Figure 6 is further emphasized in detail. The increased thickness of one medial section 42 as compared to a terminal section is clearly shown. Such construction results in increased strength effect of a nature as previously described. The diagonal disposition of the flanges to the body member 23 is also clearly shown. Also, an angular brace bar or splice 43 is shown as welded within the apex formed by the abutting edges of the angle bars.

Figure 11:
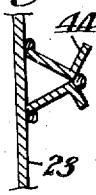
Figure 11 is a cross section on the line 11—11 of Figure 6 illustrating another modification thereof.

In Figure 11 the brace of Figure 6 is shown in modified form in which the flanges 44 of angle bars, disposed in spaced relation to the body member and extended from the common longitudinal plane, are of different width with respect to such flanges of other sections. The larger flanges may be located in the terminal sections or intermediately as required by respective needs. In the execution of Figure 6, the larger flanges may be preferably placed in sections joined at the middle.

Figure 12:
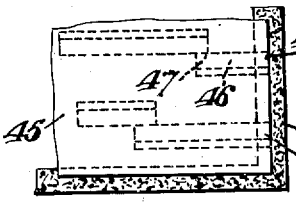
Figure 12 is a top plan view of a fraction of flooring embodying the novel stiffeners similar to the one in Figure 1, set apart in spaced relation.

The structure of Figure 12 may represent a portion of flooring comprising a sheet web 45 reinforced by spaced apart intermediate stiffeners 46 substantially of the construction shown in Figure 1, in which the lapped portions 47 in adjacent stiffeners are placed at locations intermediate to each other. The sheet web 45 is not reinforced by marginal flanges such as shown in Figure 1, but its edges are directly supported by masonry walls 45' of a building structure upon which they are placed, and the terminals of stiffeners 46 are inserted into said masonry for proper support as seen at 46', instead of having the means of support 12 and 20 of Figures 1 and 2. This method of distributing the lapped portions provides a wider support for the web and is therefore, especially adapted to thinner gauged sheets subjected to moderate stress. For maximum strength, however, it is advisable to have respective lapped portions arranged in a common line. A further feature is demonstrated in Figure 12. As shown, the stiffener located in parallel proximity to a margin of the web may have longer sections and fewer lapped portions as compared to more inwardly located stiffeners as the web requires more support at the latter location.

Figure 13:
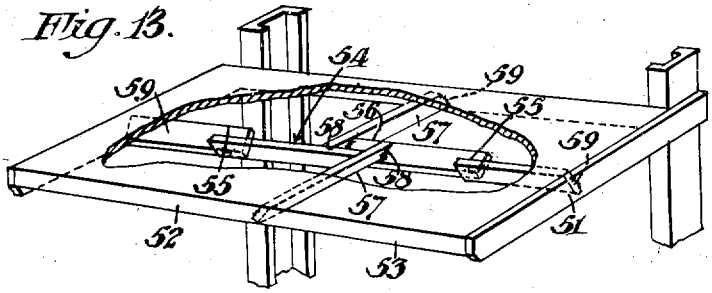
Figure 13 represents a shelf construction in a perspective view and embodying the intermediate stiffeners of Figure 1 in modified form, supplemented by an intersecting stiffener.

A modified stiffening arrangement is embodied in the shelf structure of Figure 13, having shelf arms 51 which are portions of the marginal frame 52, sustaining the body member 53 attached to upright support members. The body member is further supported by an intermediate arrangement in which a medial longitudinal stiffener 54 is of substantially similar construction to that shown in Figure 1. The stiffener includes lapped portions 55 and embodies a central point 56 where respective end portions of medial stiffeners 54 and transversely directed bar sections 57 of a supplemental stiffener are mutually abutted and secured together by welding. The sections of the supplemental stiffener are likewise reciprocally inclined towards each other and the end portions of the sections thus joined are of bevel shape as at 58 to fit the inclination of respective adjacent sections so that said central point has a pyramid-like appearance. The terminal sections 59 of the stiffeners are welded to said marginal frame as in Figure 1 for the purpose already described.

Figure 14:
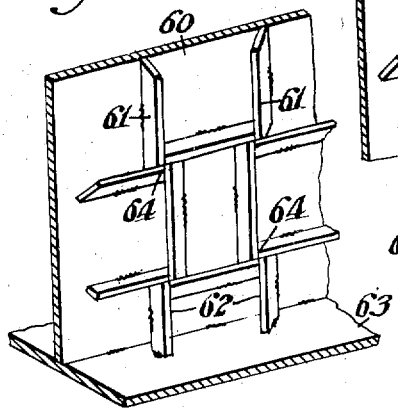
Figure 14 is a fragmentary perspective view of a heavily reinforced partition wall such as used in ships, etc., reinforced by an arrangement utilizing the features of the invention in another adaptation.

In Figure 14 a strongly reinforced partition wall such as may be used in ships is presented having a sheet web 60 supported by a mesh of spaced and mutually intersected flat bar sections 61 which are disposed and welded in reciprocal inclination towards each other and adjoined in central portions of the same characteristics as said central point portion in Figure 13. The terminal bar sections 62 are secured to a web portion at right angles to said wall portion and which may represent a section of flooring.

Figure 15:
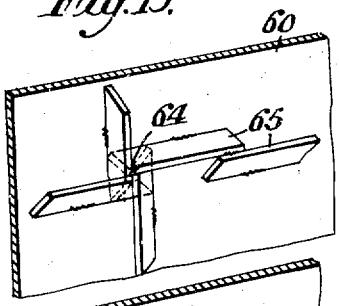
Figure 15 shows a detailed fraction of Figure 14 combined with additional features.

In Figure 15 a pyramid-like central portion 64 is illustrated in detail and said structure embodies a modified form of Figure 14. One inclined bar section 61 is replaced by two reciprocally inclined sections 65 of described nature, joined in a lapped relation intermediately between said central portions.

Figure 16:
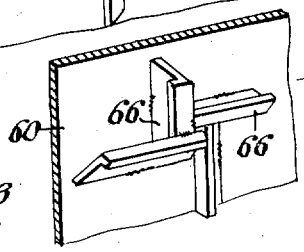
Figure 16 is a fragmentary perspective view showing the arrangements of Figures 6 and 14 in a combination.

In the structure of Figure 16, the sections of the flat bars are replaced by angle bars 66 accordingly inclined, otherwise the structure is of identical structure as in Figures 14 and 15.

It is to be understood that structures showing flat bar sections may embody bars of angular cross section or vice versa.

While I have shown and described some of preferred executions of my invention, this is by way of illustration only, and I consider as my own all such modifications in construction as fairly fall within the scope of the appended claims.

I claim:

1. A structure comprising a body member and a reinforcement therefor united with said member and having sections of elongated shape extended from each other in longitudinal alignment, said sections being disposed in alternate order substantially at opposite sides of a common longitudinal plane, longitudinal portions of said sections contiguous to said body member being spaced from said plane, said sections being inclined so that other longitudinal portions thereof lie substantially in said plane, and said reinforcement having a portion disposed over both sides of said plane in which said sections are extended over each other and united.

2. A structure comprising an extended body member and a reinforcement therefor secured to said member at contacting portions and having sections of elongated shape extended from each other in longitudinal alignment, said sections being disposed in alternate order substantially at opposite sides of a common longitudinal plane, longitudinal edge portions of said sections contiguous to said member being spaced from said plane, said sections being inclined so that other longitudinal edge portions thereof lie substantially in said plane, said reinforcement having a portion disposed over both sides of said plane in which said sections are extended over each other and united, and the terminal sections of said reinforcement being sustained by support members.

3. A structure comprising an extended body member and a reinforcement therefor united with said member and having sections of elongated shape extended from each other in longitudinal alignment, said sections being disposed in alternate order substantially at opposite sides of a common longitudinal plane, longitudinal portions of said sections contiguous to said body member being spaced from said plane, said sections being inclined so that other longitudinal portions thereof lie substantially in said plane, said reinforcement having a portion disposed over both sides of said plane in which said sections are extended over each other and united, and at least one of said sections having a support member being opposed substantially to the inner side of the supported section with said support member of a length shorter than said section.

4. The structure of claim 3 in which said support member is located substantially at a terminal of said reinforcement.

5. The structure of claim 3 in which said support member is located intermediately between the end portions of said supported section.

6. The structure of claim 3 in which said support member is inclined toward said supported section.

7. A structure comprising an extended body member and a reinforcement therefor united with said member and having sections of elongated shape extended from each other in longitudinal alignment, said sections being disposed in alternate order substantially at opposite sides of a common longitudinal plane, longitudinal portions of said sections contiguous to said body member being spaced from said plane, said sections being inclined so that other longitudinal portions thereof lie substantially in said plane, said reinforcement having a portion disposed over both sides of said plane in which said sections are extended over each other and united, and said portion being of a length shorter than the longitudinal extensions of said sections extended from the portion.

8. A structure comprising an extended body member and a reinforcement therefor united with said member and having sections of elongated shape extended from each other in longitudinal alignment, said sections being disposed in alternate order substantially at opposite sides of a common longitudinal plane, longitudinal portions of said sections contiguous to said body member being spaced from said plane, said sections being inclined so that other longitudinal portions thereof lie substantially in said plane, said reinforcement having a portion disposed over both sides of said plane in which said sections are extended over each other and united, and the terminals of said reinforcement lying substantially at respective opposite end portions of said body member.

9. A structure comprising an extended body member and a reinforcement therefor secured to said member at contacting portions and having sections of elongated shape extended from each other in longitudinal alignment, said sections being disposed in alternate order substantially at opposite sides of a common longitudinal plane, longitudinal edge portions of said sections contiguous to said member being spaced from said plane, said sections being inclined so that other longitudinal edge portions thereof lie substantially in said plane, said reinforcement having a portion disposed over both sides of said plane in which said sections are extended over each other and united, and the inclination of said sections being in planes lying at an acute angle to each other.

10. A structure comprising an extended body member and a reinforcement therefor secured to said member at contacting portions and having sections of elongated shape extended from each other in longitudinal alignment, said sections being disposed in alternate order substantially at opposite sides of a common longitudinal plane, longitudinal edge portions of said sections contiguous to said member being spaced from said plane, said sections being inclined so that other longitudinal edge portions thereof lie substantially in said plane, said reinforcement having a portion disposed over both sides of said plane in which said sections are extended over each other and united, and said portion being located substantially at the midsection of said reinforcement.

11. A structure comprising an extended body member and a reinforcement therefor secured to said member at contacting portions and having sections of elongated shape extended from each other in longitudinal alignment, said sections being disposed in alternate order substantially at opposite sides of a common longitudinal plane, longitudinal edge portions of said sections contiguous to said member being spaced from said plane, said sections being inclined so that other longitudinal edge portions thereof lie substantially in said plane, said reinforcement having a portion disposed over both sides of said plane in which respective sections are extended over each other and united, and said elongated sections comprising an even number.

12. A structure comprising an extended body member and a reinforcement therefor secured to said member at contacting portions and having sections of elongated shape extended from each other in longitudinal alignment, said sections being disposed in alternate order substantially at opposite sides of a common longitudinal plane, longitudinal edge portions of said sections contiguous to said member being spaced from said plane, said sections being inclined so that other longitudinal edge portions thereof lie substantially in said plane, said reinforcement having portions disposed over both sides of said plane in which said sections are extended over each other and united, and one of said portions being located substantially at the midsection of said reinforcement and of a length greater than the other respective portions.

13. A structure comprising an extended body member and a reinforcement therefor secured to said member at contacting portions and having sections of elongated shape extended from each other in longitudinal alignment, said sections being disposed in alternate order substantially at opposite sides of a common longitudinal plane, longitudinal edge portions of said sections contiguous to said member being spaced from said plane, said sections being inclined so that other longitudinal edge portions thereof lie substantially in said plane, said reinforcement having a portion disposed over both sides of said plane in which said sections are extended over each other and united, and respective elongated sections forming terminal sections in said reinforcement being disposed substantially at opposite sides of said common plane and in oppositely inclined planes relative to each other.

14. A structure comprising an extended body member and a reinforcement therefor secured to said member at contacting portions and having sections of elongated shape extended from each other in longitudinal alignment, said sections being disposed in alternate order substantially at opposite sides of a common longitudinal plane, longitudinal edge portions of said sections contiguous to said member being spaced from said plane, said sections being inclined so that other longitudinal edge portions thereof lie substantially in said plane, said reinforcement having a portion disposed over both sides of said plane in which said sections are extended over each other and united, and the length of said sections in said portion disposed over both sides of said plane being greater at the location of said plane than at said contacting portions.

15. A structure comprising an extended body member and a reinforcement therefor secured to said member at contacting portions and having at least four sections of elongated shape extended from each other in longitudinal alignment, said sections being disposed in alternate order substantially at opposite sides of a common longitudinal plane, longitudinal edge portions of said sections contiguous to said member being spaced from said plane, said sections being inclined so that other longitudinal edge portions thereof lie substantially in said plane, said reinforcement having portions disposed over both sides of said plane in which said sections are extended over each other and united, and the terminal sections in said reinforcement being of a length greater than sections disposed intermediately therebetween.

16. A structure comprising an extended body member and a reinforcement therefor secured to said member and assembled from separate sections of elongated shape extended from each other in longitudinal alignment, said sections being disposed in alternate order substantially at opposite sides of a common longitudinal plane, longitudinal edge portions of said sections being spaced from said plane and secured to said body member, said sections being inclined so that other longitudinal edge portions thereof lie substantially in said plane, said sections overlapping each other and being secured together in the overlapped parts, and the terminal sections of said reinforcement being sustained by support members.

17. The structure of claim 16 in which said separate sections are flat bar members respectively disposed and inclined so as to have respective longitudinal edge portions welded to said body member and the other longitudinal edge portions located substantially in said plane, and said flat bar members being secured together in the overlapped parts by welding the overlapping and opposing longitudinal edge portions lying in said plane to each other.

18. A structure comprising a body member and a reinforcement therefor united with said member and having sections of elongated shape extended from each other in longitudinal alignment, said sections being disposed in alternate order substantially at opposite sides of a common longitudinal plane, longitudinal portions of said sections contiguous to said body member being spaced from said plane, said sections being inclined so that other longitudinal portions thereof lie substantially in said plane, said reinforcement having a portion disposed over both sides of said plane in which said sections are extended over each other and united, and said sections being reinforced by extensions disposed longitudinally of the reinforcement and in spaced relation to the body member with transverse portions of the extensions directed from said common plane in directions substantially away from said plane.

19. The structure of claim 18 in which said sections are provided by separate angle members having respective longitudinal edge portions welded to said body member, said angle members being further disposed so as to have the longitudinal edge portions at their angle vertex located substantially in said plane with respective flanges directed therefrom to the body member and outwardly in spaced relation to the body member, said angle members overlapping each other to define said portion disposed over both sides of said plane and being secured together in the overlapped parts by welding the overlapping and opposing edge portions lying in said plane to each other, and said extensions being defined by said outwardly directed flanges.

20. A structure comprising a body member and a reinforcement therefor united with said member and having sections of elongated shape extended from each other in longitudinal alignment, said sections being disposed in alternate order substantially at opposite sides of a common longitudinal plane, longitudinal portions of said sections contiguous to said body member being spaced from said plane, said sections being inclined so that longitudinal edge portions thereof lie substantially in said plane, said reinforcement having a portion disposed over both sides of said plane in which said sections are extended over each other and united, and said longitudinal edge portions in said plane being of increased thickness.

21. The structure of claim 2 in which said body member is defined by a web supported within a frame, and said reinforcement being intermediately located on said frame and having said support members for the terminal sections provided by portions of said frame.

22. A structure comprising an extended body member and a reinforcement therefor united with said member and having sections of elongated shape extended from each other in longitudinal alignment, said sections being disposed in alternate order substantially at opposite sides of a common longitudinal plane, longitudinal portions of said sections contiguous to said body member being spaced from said plane, said sections being inclined so that other longitudinal portions thereof lie substantially in said plane, said reinforcement having a portion disposed over both sides of said plane in which said sections are extended over each other and united, and said reinforcement being intersected by a supplemental reinforcement united with said body member and having elongated sections extended in opposite directions from said portion over both sides of said plane.

23. The structure of claim 22 in which said sections of the supplemental reinforcement are reciprocally inclined towards each other from their locations of attachment to the body member, and end portions of said reciprocal sections being secured to inclined end portions of respective sections of said reinforcement at said portion disposed over both sides of said plane.

24. In a structural element, a web member to be supported, said support including a combination of mutually intersecting reinforcement members secured to said web at contacting portions, said reinforcements having sections of elongated shape extended from each other in respective longitudinal alignments, said sections being disposed in alternate order substantially at opposite sides of a common longitudinal plane in each of said reinforcements, longitudinal edge portions of said sections contiguous to said web being spaced from a respective plane and said sections being inclined so that other longitudinal edge portions thereof lie substantially in a respective plane, and said sections of each of said reinforcements being secured together in a common pyramid-like shaped portion disposed over both sides of said plane in one reinforcement and said plane in another reinforcement at the intersection thereof and in which transversely slanted end portions of said sections contact the inclined portions of adjacent sections mutually directed at an angle to each other.

25. The structure of claim 24 in which at least one of said reinforcements is supplemented by elongated sections extended longitudinally of the reinforcement and from respective inclined elongated sections therein, said inclined sections and said supplemental sections being reciprocally inclined toward each other and united in portions disposed over both sides of a respective plane in the reinforcement in which portions of said reciprocally inclined sections are extended over each other.

26. A structure comprising a web body and a combination of reinforcements therefor secured to said web at contacting portions, said combination being characterized as having reinforcement members extended from opposite sides of a structural section disposed and extended at an angle thereto, said members having sections of elongated shape extended from each other in respective longitudinal alignments, said sections being disposed in alternate order substantially at opposite sides of a common longitudinal plane in each of said members, longitudinal edge portions of said sections contiguous to said web body being spaced from a respective plane, said sections being inclined so that other longitudinal edge portions thereof lie substantially in a respective plane, each of said members having a portion disposed over both sides of a respective plane in which respective sections are extended over each other and united, and respective elongated sections of said members adjacent to said structural section being alternately inclined toward a common plane relative to each other and having their end portions secured to the structural section.

27. The structure of claim 1 in which said body member is defined by a web member and there is a plurality of reinforcements arranged in spaced relation of a character defined by said reinforcement.

28. The structure of claim 1 in which said body member is defined by a web and there is a plurality of reinforcements arranged in spaced relation, and said arrangement including a reinforcement extended adjacent to an edge portion of said web in substantially parallel relation thereto with said elongated sections of a length greater than respective sections of another reinforcement spaced therefrom.

29. The structure of claim 1 in which said body member is defined by a web member and there is a plurality of reinforcements arranged in spaced relation of a character defined by said reinforcement, and said portion in each of said reinforcements being located substantially in a common line.

30. A structure comprising an extended body member and a reinforcement therefor secured to said member at contacting portions and having at least four separate sections of elongated shape extended from each other in longitudinal alignment, said sections being disposed in alternate order substantially at opposite sides of a common longitudinal plane, longitudinal edge portions of said sections contiguous to said body member being spaced from said plane, said sections being inclined so that other longitudinal edge portions thereof lie substantially in said plane, said sections overlapping each other and being secured together in the overlapped parts, and respective elongated sections forming the central sections in said reinforcement being of a thickness greater than other sections therein.

FREDERICK KAUTZ.

No references cited.